Oct. 25, 1966  H. L. KOMBEREC  3,280,763
ICED CONFECTION EXTRUSION APPARATUS
Filed April 13, 1964  6 Sheets-Sheet 4
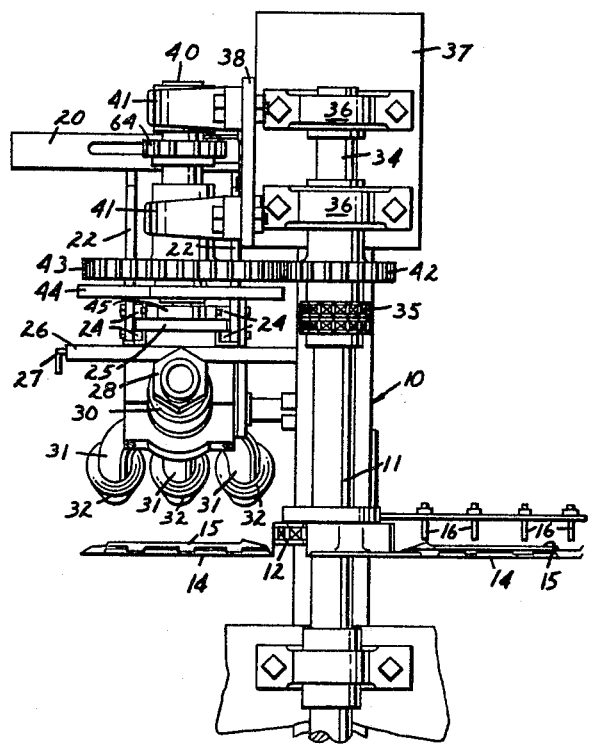
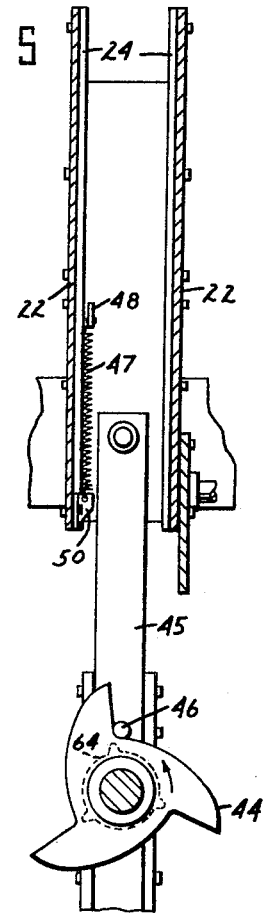
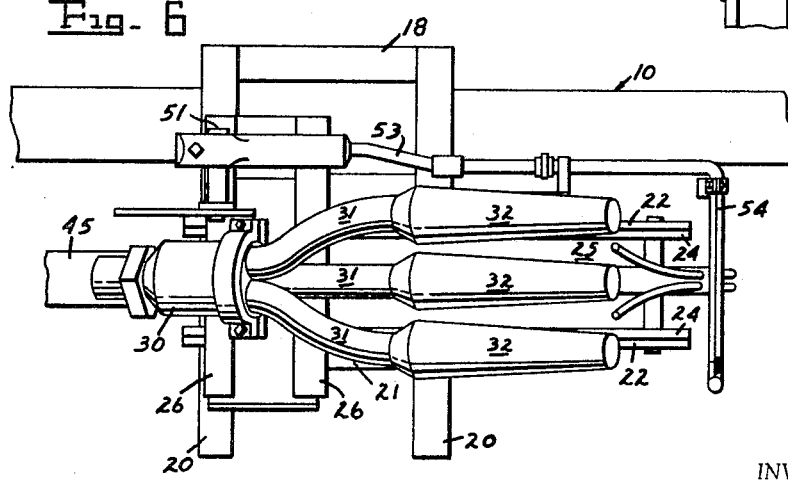
INVENTOR.
HAROLD L. KOMBEREC
BY *Wells & St.John*
ATTYS.

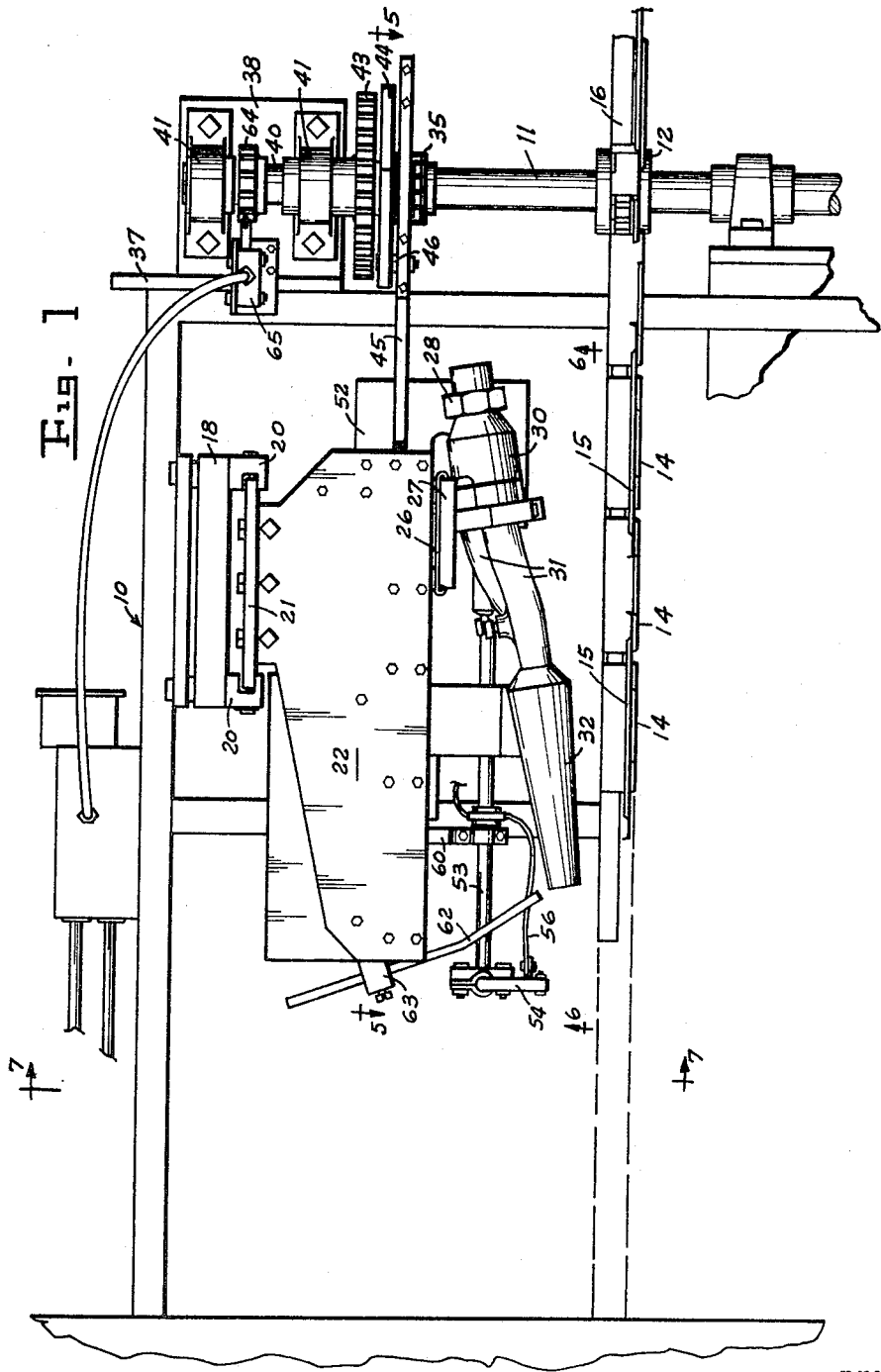

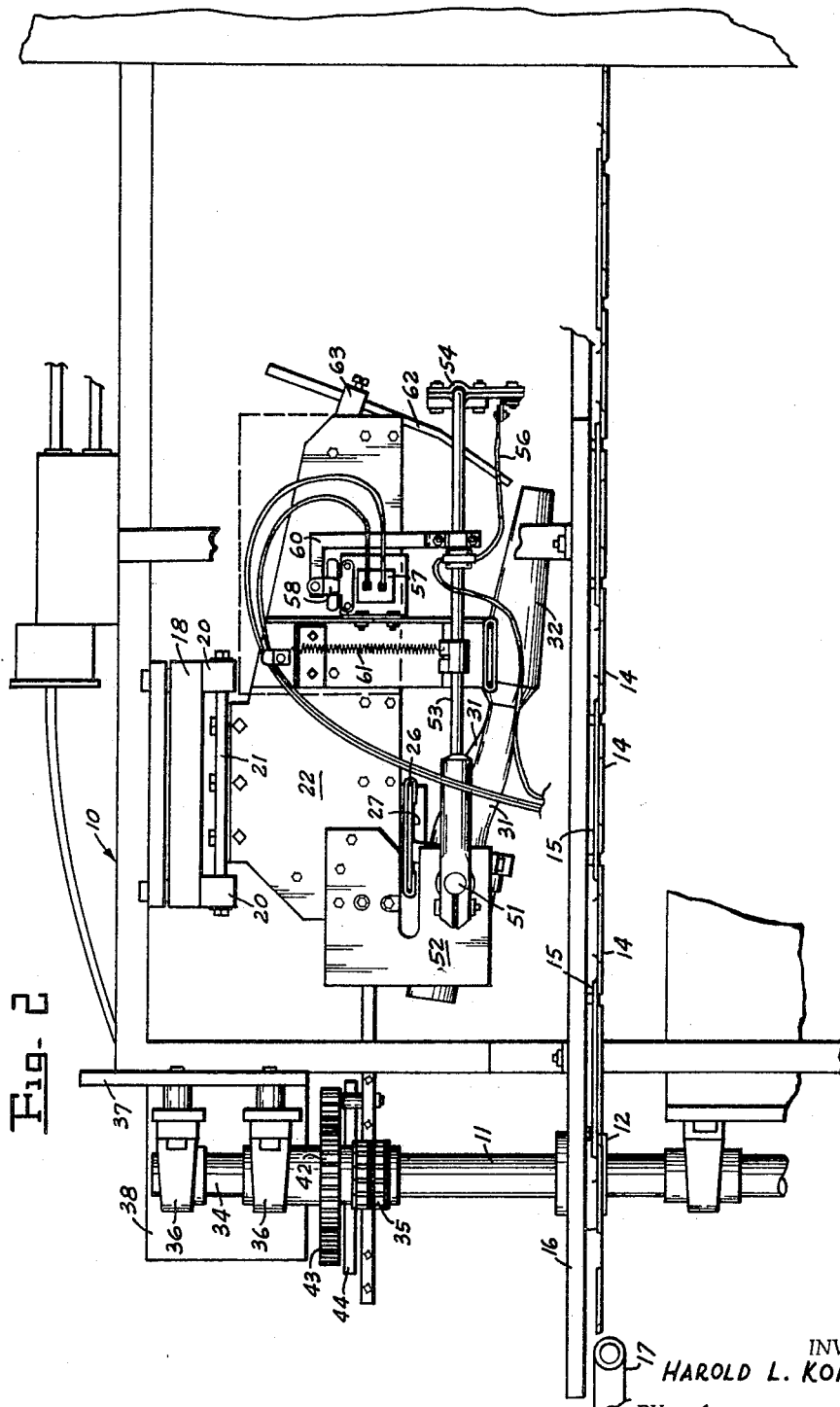

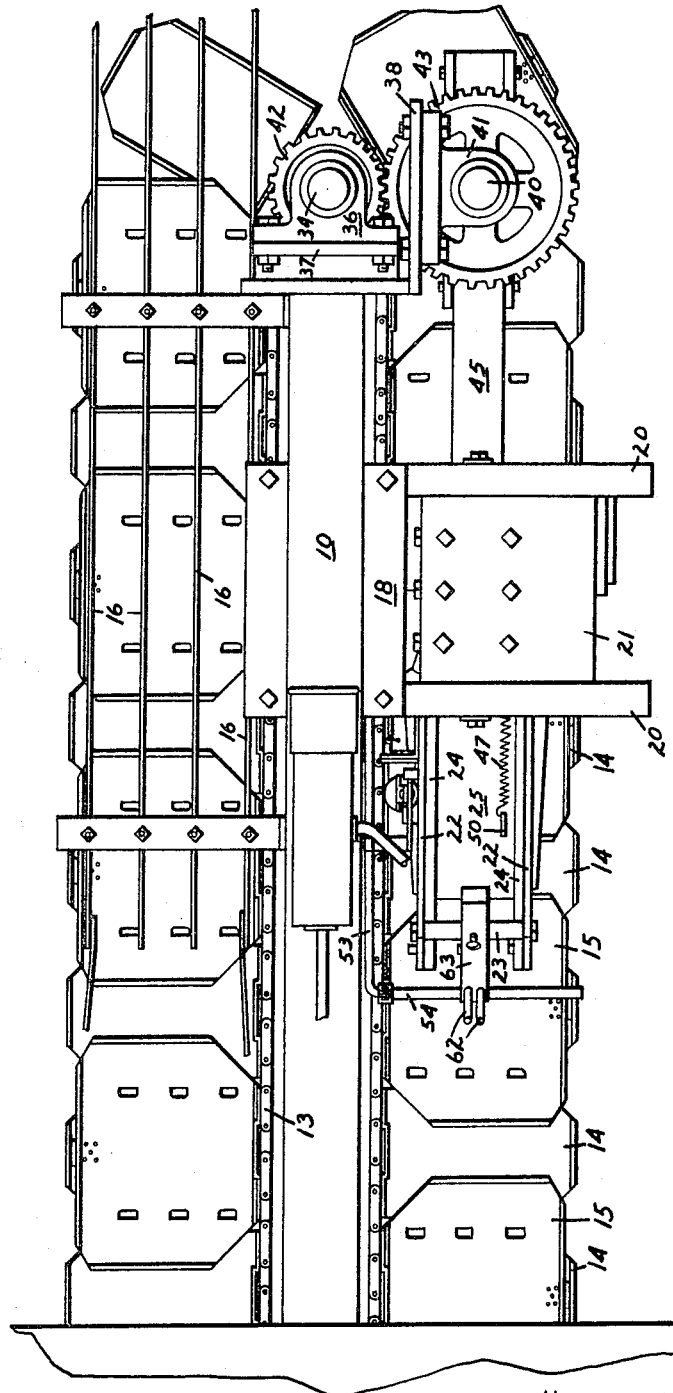

Oct. 25, 1966

H. L. KOMBEREC 3,280,763

ICED CONFECTION EXTRUSION APPARATUS

Filed April 13, 1964

INVENTOR.
HAROLD L. KOMBEREC
BY
ATTYS.

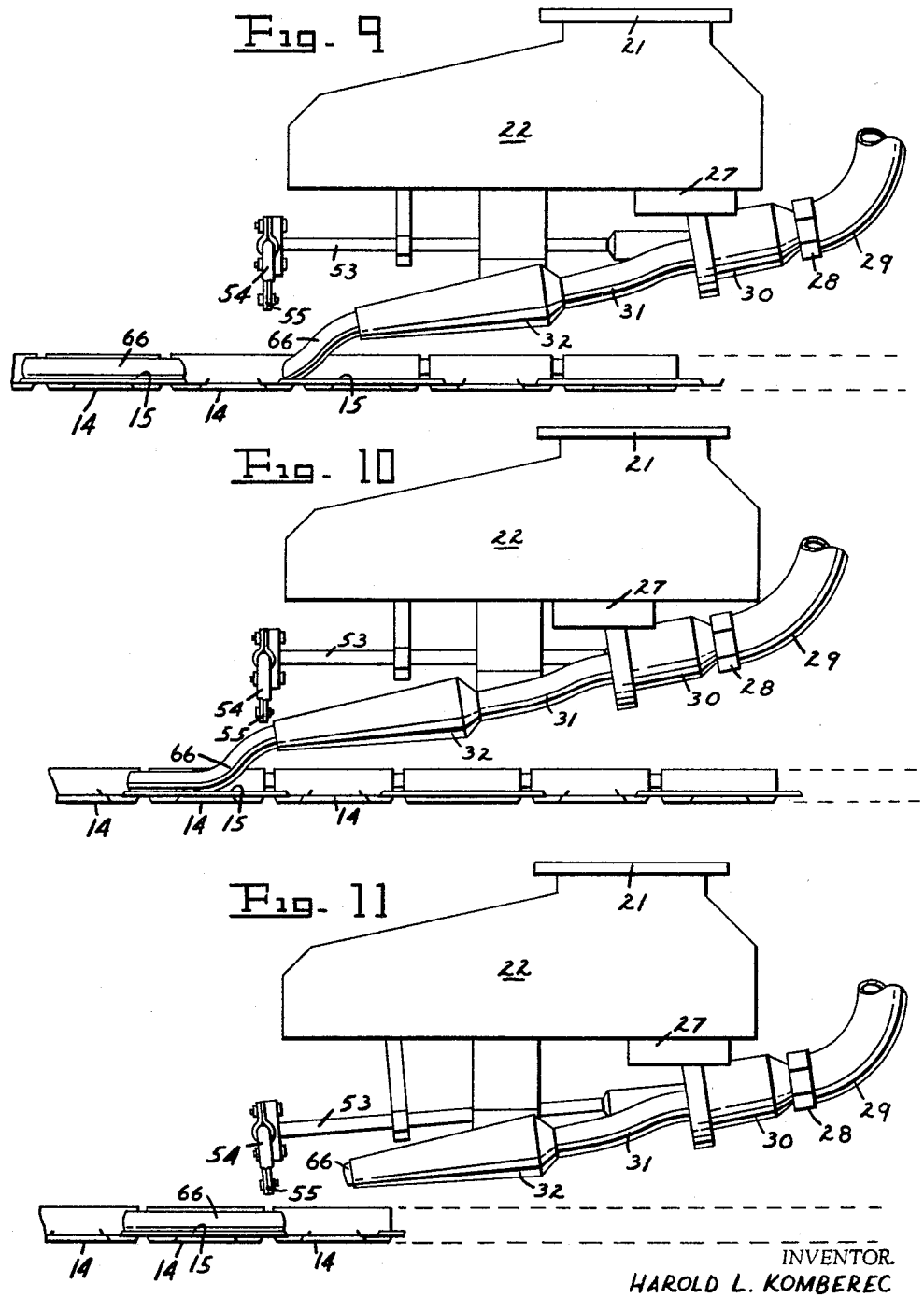

United States Patent Office 3,280,763
Patented Oct. 25, 1966

3,280,763
ICED CONFECTION EXTRUSION APPARATUS
Harold L. Komberec, Spokane, Wash., assignor to Komberec and Fiedler Enterprises, Inc., Spokane, Wash., a corporation of Washington
Filed Apr. 13, 1964, Ser. No. 359,042
10 Claims. (Cl. 107—14)

This invention relates to a novel extrusion apparatus for a semi-frozen iced confection. It is primarily concerned with the extrusion of interrupted cylindrical lengths of such material onto a moving horizontal conveyor.

The present invention is concerned with an extrusion apparatus for formation of the basic cylindrical iced confection core required in the production of a confection by the apparatus described in my co-pending patent application Ser. No. 305,605, filed August 30, 1963, for Machine for Manufacturing Frozen Confections. This confection requires the production of frozen cores of iced milk or iced cream formed in acurately defined cylindrical lengths. The present device is adapted to extrude the required shape of iced confection material onto a conveyor, where it can be carried through a freezing tunnel and eventually delivered to a machine of the type shown in the previously mentioned co-pending application.

It is a first object of this application to provide such an apparatus which will place longitudinal lengths of extruded material onto a moving conveyor with a minimum of motion between the extruded material and the conveyor on which it is received in order to insure maximum dimensional uniformity in the resulting product.

Another object of this invention is to provide such a device that can be readily adapted to existing freezing tunnel facilities without disturbing the basic existing tunnel and conveyor structure. The device is adapted to be a readily mounted attachment for such existing facilities.

Another object of this invention is to provide such an apparatus with proper speed relation between the extrusion facilities and the conveyor so that a continuous stream of extruded material can be utilized, the placement of the stream being interrupted by longitudinal spacing between the extruded lengths of semi-frozen material.

These and further objects will be evident from the disclosure following, taken in conjunction with the accompanying drawings, which illustrate a preferred form of the invention. It is to be understood that this form of the invention is merely exemplary, and that various modifications might be made without deviating from its intended scope.

In the drawings:

FIGURE 1 is a side view looking toward the extrusion apparatus, with portions of the surrounding framework being broken away;

FIGURE 2 is a side view opposite to FIGURE 1, the supporting framework being broken away to show the extrusion apparatus, and a protective cover being illustrated in dashed lines;

FIGURE 3 is a top view of the structure shown in FIGURE 1;

FIGURE 4 is an end view of the apparatus as seen from the right in FIGURE 1;

FIGURE 5 is a sectional view taken along line 5—5 in FIGURE 1, illustrating the cam movement that reciprocates the extrusion nozzle;

FIGURE 6 is a bottom view of the apparatus as seen along line 6—6 in FIGURE 1;

FIGURE 9 is a first diagrammatic view illustrating the operation of the device;

FIGURE 10 is a view similar to FIGURE 9, showing the extreme position of the extrusion apparatus; and FIGURE 11 is a third view similar to FIGURE 9 showing the material after having been cut from the nozzle stream, the nozzle being returned to its initial position.

Figure 7:
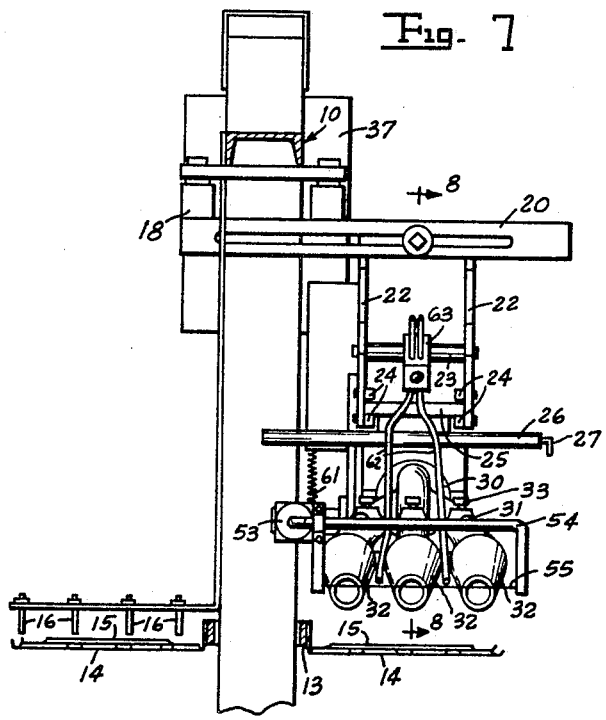
FIGURE 7 is an end view of the apparatus as seen along line 7—7 in FIGURE 1.

The device illustrated in the drawings is shown mounted on the combined inlet and outlet end of a conventional existing freezing tunnel of the type utilized in the preparation of frozen confections such as ice cream bars or cakes, the confections being solidly frozen after placement on a conveyor that leads to a freezing tunnel. The confections are then carried out of the tunnel for later processing and packaging. A rather typical freezing tunnel apparatus is shown in the patent to Nelson et al, No. 2,677,943. The details of the tunnel are not pertinent to the disclosure contained herein, and no tunnel structure is illustrated other than the existing external portion of the conveyor wherein the confection is respectively placed on the conveyor and removed from the conveyor after being frozen. It is to be understood that the instant device is applicable to many variations in either tunnel or conveyor structure.

The basic existing structure with which this invention is concerned can best be understood from a study of FIGURES 1 through 3. A rectangular supporting framework 10 is shown in the drawings, portions of the framework being broken away to accommodate the illustration of the pertinent portions of this invention. At one end of the framework 10 is an upright shaft 11 that carries a sprocket 12 on which is engaged the tunnel apparatus. At each side of the framework 10 the conveyor trays 14 travel in a straight line within a horizontal plane.

Viewing the apparatus in FIGURE 3, the lower straight section of the conveyor is the portion at which frozen confections would normally be placed on the trays 14 while the upper section is the portion on which the frozen materials, after emerging from the freezing tunnel, are wiped from the trays 14 and carried by other conveyors for further processing. In the present case, due to the length of the confection strips utilized in the manuafcture of the cylindrically shaped confection, it was necessary to attach to the trays 14 enlarged trays 15 that slip over the existing trays 14 to provide a longer tray surface. The trays 15 overlap adjacent trays 14, and only alternate trays 14 are utilizezd to carry the modified trays 15. This structure is believed to be evident from a study of FIGURES 1, 2 and 3.

At the upper portion of FIGURE 3 is a modified discharge arrangement for feeding the longitudinal strips from the modified trays 15. This includes a plurality of guide strips 16 extending longitudinally parallel to the straight line portion of the exit section of the conveyor and located directly adjacent to the upper surfaces of the modified trays 15. The strips 16 form three channels within which the three rolls of cylindrical frozen bars will travel. As the trays 15 continue to the end of the framework 10 (to the right in FIGURE 3) the bars will continue in a straight direction although the trays 15 will obviously turn about the center of the shaft 11. The bars will then be carried by a receiving conveyor shown fragmentarily in FIGURE 2 and designated by the numeral 17. Again, since the present invention is concerned primarily with the placement of the bars on the trays 15, additional detail as to the exit portion of the conveyor is not believed to be required.

The existing types of tunnels normally have a supporting bracket on the framework 10 for the reception of an extrustion head to place confection materials on the trays 14. In the present instance, the mounting bracket is shown best in FIGURE 1, and is designated by the numeral 18. Along the lower portion of the bracket 18 are two inwardly facing slotted bars 20 that provide a transverse slotted arrangement for the reception of the extrusion device. The extrusion device is mounted by sliding support within the bars 20 so as to make it more readily interchangeable with other types of extrusion devices.

Slidably received between the slotted bars 20 is a horizontal upper support plate 21. The plate 21 has downwardly depending frame sides 22 secured rigidly to it and extending longitudinally parallel to the direction of movement of the section of conveyor immediately below it. A number of spacer blocks 23 join the two plates 21 to provide a rigid frame structure.

Figure 8:
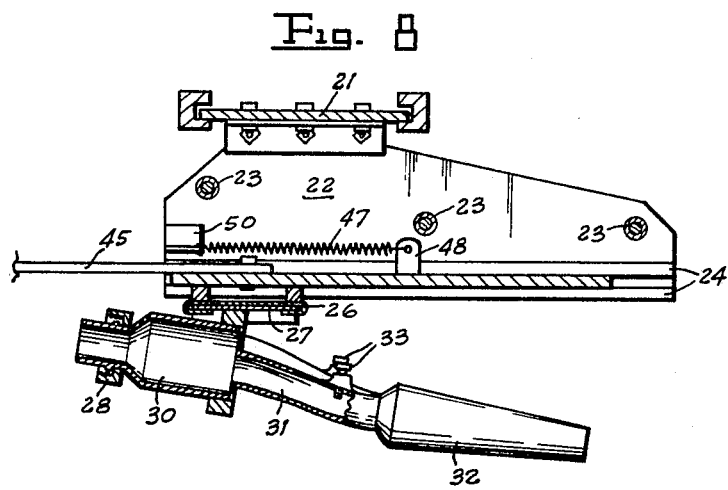
FIGURE 8 is a vertical section view through the extrusion assembly as seen along line 8—8 in FIGURE 7.

At the lower horizontal edge of each support plate 21 are fixed a pair of spaced guide strips 24 that form inwardly directed slots which slidably support a movable horizontal plate 25. The plate 25 is the basic supporting structure for the moving extrusion nozzles carried at the bottom of the fixed portions of the framework, and provides a movable frame member for the nozzle apparatus. At the lower surface of plate 25 is a bracket 26 that slidably receives a transversely movable support plate 27 designed to facilitate replacement or removal of the nozzle arrangement for cleaning or repair purposes. It is believed that this structure is evident from FIGURES 1, 2 and 8.

Mounted on the plate 27 is a central nozzle chamber 30 having a conventional type of hose connection 28 adapted to be connected to a flexible supply hose 29 (FIGURES 9–11) through which the semi-frozen confection material is delivered to the nozzle chamber 30. The nozzle chamber 30 opens to three nozzle tubes 31 equally located about its surface, and the tubes 31 in turn terminate in nozzles 32 having the cross-sectional configuration shown in the drawings. The nozzles are tapered toward the outer orifices, so as to provide back pressure in the material being extruded to thereby better control its flow. Each nozzle tube 31 is provided with an adjustable restriction screw 33 to facilitate the balancing of the flow through the three nozzles, so that each can operate with the same volume of material being extruded.

As will be understood from a study of the drawings, the upper mounting or support plate 21 is slidably received within the bracket 18 for transverse movement relative thereto. As shown in FIGURE 7, a bolt 19 is received within a slot 19a at each side of the bracket 18 to limit this transverse movement between the location shown in FIGURE 7 and an extreme location to the right of that illustrated wherein the nozzles 32 would clear the trays 15. This movement is necessary in order to allow extruded material to fall free of the trays 15 for the purposes of starting up the device and for adjustment due to variations in the confection mix. Also, the bracket 26 and plate 27 provide ready acess to the nozzle structure without disturbing the remaining portions of the rigid supporting framework or the movable frame that carries the nozzle structure. The movement of plate 25 is designed to provide the required longitudinal reciprocation of the nozzles 32 as will be described in connection with the operation of this apparatus.

Extending upwardly from the shaft 11, according to this modification of the existing equipment, is an extension shaft 34 that is co-axial with the shaft 11. The shaft 34 is rotatably journalled on the framework 10 by means of bearings 36 and is coupled to the shaft 11 by means of a conventional type of coupling 35. The bearings 36 are mounted on an upright plate 37 fastened to the basic framework 10.

A perpendicular upright plate 38 is mounted on the framework 10 adjacent one side of the plate 37. The plate 38 rotatably carries a shaft 40 within bearings 41. The shaft 40 is driven from the shaft 34 by means of intermeshing gears 42, 43 fixed respectively to the shafts 34 and 40. The gear ratio between the intermeshing gears 42 and 43 will depend upon the dimensions of the trays 15 and the size of the extruded bar desired to be placed thereon.

Fixed to the lower end of the shaft 40 is a cam 44 that can best be seen in detail in FIGURE 5. In the preferred form of the embodiment, the cam 44 has three identical sections located equi-angularly about its periphery. Each section has a peripheral radius increasing gradually to a maximum and then dropping off abruptly to its initial radius in the direction in which the cam 44 is rotated. The periphery of cam 44 is engaged by a roller cam follower 46 mounted on a cam follower slide 45. Slide 45 receives the shaft 40 and is pivoted at 49 to the upper surface of the slidable plate 25 mounted between frame sides 22. The cam follower 46 is held against the cam 40 by means of a compression spring 47 extending between a bracket 48 on the plate 25 and a bracket 50 on one of the frame sides 22. Thus, the plate 27 will be reciprocated due to rotation of the cam 44, the reciprocation being a rather slow movement radially out from the center of shaft 40 and an abrupt return movement.

The supporting arrangement and drive mechanism just described will cause the nozzles 32 to move slowly in the direction of movement of the trays 15 directly below them and then to abruptly return a specified distance necessary to span the distance between adjacent trays 15 on the conveyor. During the extrusion of semi-frozen material as shown in FIGURES 9, 10 and 11, the timed relation between the conveyor and the movement of the nozzles 32, achieved by proper selection of the ratio between gears 42 and 43, makes full advantages of the constant supply of extruded material being directed from the nozzles 32. Although the flow of material is constant, an interruption is provided between the lengths of material as they are placed on each adjacent tray 15. In order to minimize distortion of the material after being extruded, it is essential that the flow of material from the nozzles 32 is at a rate of speed relative to the moving tray 15 on which it is deposited so that there is no relative movement between the material and the tray. The forward movement (to the left in FIGURE 1) of nozzles 32 due to the cam 44 is preferably just slightly less than the speed of the tray 15 below it. The additional rate of speed required in order to equal the speed of tray 15 is provided by the rate of flow of the material relative to nozzles 32.

When the nozzles 32 have covered the desired length of the tray 15 on which material is being deposited, it is necessary to physically cut the material so that the nozzles 32 can quickly retract to span the gap between the adjacent trays 15 prior to depositing material on the subsequent tray 15. This cutting action is accomplished by means of the structure shown to the left of the nozzles 32 in FIGURE 1, and best seen in FIGURES 2, 6 and 7.

The material cut off apparatus is mounted on a transverse pivot shaft 51 carried on a downwardly depending bracket 52 at one side of the structure (FIGURE 2). The transverse pivot shaft 51 carries an arm 53 that extends beyond the extreme position of the nozzles 32, and which will be adjacent to the end of each of the nozzles 32 when fully extended by cam 44. Extension arm 53 terminates in a transverse bent end 54 that supports a transverse wire 55 that is the actual cutting element of the structure. Wire 55 is preferably heated for electrical resistance and the electrical connection required is shown in the drawings and designated by the numeral 56.

The wire 55 is moved across the stream of material by means of an electrical solenoid 57 having an actuating arm 58 pivoted to a connecting link 60 which in turn is connected to the extension arm 53. A compression spring 61 is connected between the extension arm 53 and the adjacent frame sides 22 and serves to bias the arm 53 to its upper position. Actuation of the solenoid 57 will cause the arm 53 to move downwardly, bringing the wire 55 across the stream of fluid being discharged from the nozzles 32.

Operation of the solenoid 57 must be timed relative to the shaft 34 and shaft 40. This is acomplished by means of a second cam 64 fixed to the shaft 40 and located above the gear 43 (FIGURE 1). The cam 64 is a simple three lobed cam with each lobe angularly located relative to shaft 40 at a position coincident with the greatest radii on cam 44. The shape of cam 64 has been superimposed about shaft 40 in FIGURE 5 so as to show the relationship involved. The cam 64 operates a switch 65 as each lobe of cam 64 moves the actuating element of switch 65. Thus, actuation of solenoid 57 is timed precisely the moment when the nozzles 32 are fully extended to the left in FIGURE 1, and therefore adjacent to wire 55. At this instant, the wire 55 will be brought downward by actuation of solenoid 57, and the nozzles 32 will immediately be retracted in an abrupt quick action for placement of the interrupted extruded material on the next tray 15.

In order to maintain the nozzles 32 at the proper temperature so as to prevent the nozzles 32 from becoming clogged by frozen material, it has been found advisable to direct air at room temperature about the nozzles 32. A pair of open tubes 62 are shown in the drawings, mounted by a bracket 63 extending between the frame sides 22, and adapted to be connected to a suitable source of room temperature air. The tubes 62 are directed so as to bring the warm air about the nozzle openings and to prevent the nozzles 32 from becoming severely frosted.

It is believed that the operation of the device is clear from the foregoing description, however, capsuled in the operational views diagrammatically it has been shown in FIGURES 9, 10 and 11. In FIGURE 9, initial placement of the extruded material 66 is shown as it first begins to leave the end of a nozzle 32. It is to be understood that three such strips of material are deposited simultaneously in the embodiment shown. As the timing of the device has been described, the material 66 will not have moved relative to the tray 15, since the total of material speed plus nozzles speed will equal the speed of tray 15.

In FIGURE 10, the desired length of material 66 has been deposited on the tray 15, the nozzle 32 being shown in extreme extended position. At this position, the cam follower 46 would be riding at the maximum radius of cam 44. At this instant, the cam 64 will actuate switch 65, causing solenoid 57 to bring the wire 55 across the stream of material 66. The material 66 will therefore be terminated on the tray 15 as shown in FIGURE 11, and the nozzle 32 will immediately be retracted to its initial position for repetition of the process on the immediately following tray 15.

It is obvious that minor modifications might be necessary in order to adapt this structure to existing or future machines of the general type described. However, the invention is concerned with the basic moving nozzle arrangement for extruding cylindrical lengths of semi-frozen confection material on continuously moving trays. The apparatus described makes it possible to use a continuous stream of material through the nozzles, although the finished lengths themselves are interrupted and spaced from one another. The device provides accurate control of the material length, since there is no relative movement between the extruded material and the tray upon which it is received. In practice, the device has been found to be most accurate and suitable for high production operations.

Having thus described my invention, I claim:

1. In combination with a rigid supporting framework, a continuous conveyor mounted on said framework having a supporting surface adapted to carry confection material for further processing, and including a straight section moving at a constant speed relative to said framework;

an extrusion apparatus adapted to direct a strip of semi-frozen confection material onto the supporting surface of said conveyor in longitudinally interrupted lengths, comprising:

a frame member movably mounted on said framework for motion relative to said framework in a direction parallel to the direction of motion of said conveyor section;

nozzle means mounted on said frame member including a nozzle outlet facing in the direction of motion of said conveyor section and located adjacent the supporting surface of said conveyor section;

operating means on said framework operatively connected to said frame member and to said conveyor adapted to reciprocate said frame member relative to said framework in a timed relation with movement of said conveyor;

and supply means operatively connected to said nozzle means adapted to direct semi-frozen confection material through the nozzle outlet.

2. The combination defined in claim 1 further comprising:

means on said framework adapted to periodically interrupt the continuity of material extruded from said nozzle outlet.

3. The combination as defined in claim 1 wherein said nozzle means further includes:

additional nozzle outlets identical to said nozzle outlet and located on said frame member in parallel, side by side locations;

each of said nozzle outlets being provided with individual adjustable restriction means whereby the flow through each from said supply means can be balanced relative to the flow through the remaining nozzle outlets.

4. The combination as defined in claim 1 wherein said operating means is adapted to move said frame member in the direction of movement of said conveyor section relative to said framework at a rate of speed slightly less than the speed of said conveyor section and then quickly return said frame member to its starting position relative to said framework.

5. The combination as defined in claim 1 wherein said operating means comprises:

a revolving cam mounted on said framework for rotation about an axis located in a plane perpendicular to the direction of motion of said conveyor section relative to said framework, said cam having a peripheral configuration increasing gradually in radius in its intended direction of rotation on said framework and abruptly returning to its initial radius;

and cam follower means engaged by the peripheral configuration of said cam operatively connected to said frame member adapted to impart reciprocable movement to said frame member responsive to rotation of said cam.

6. In combination with a rigid supporting framework:

a continuous conveyor mounted on said framework having a section thereof moving in a straight line relative to said framework, said conveyor having a supporting surface adapted to receive confection material for further process, and power means connected to said conveyor adapted to continuously move said conveyor relative to said framework at a constant rate of speed, an extrusion apparatus adapted to place interrupted longitudinal strips of semi-frozen confection material on the conveyor, comprising:

a frame member movably mounted on said framework adjacent said conveyor section for reciprocable motion parallel thereto;

nozzle means fixed relative to said frame member including a nozzlze outlet open toward the direction of motion of said conveyor section, said outlet being located directly above the supporting surface of said conveyor;

operating means of said framework operatively connected to said frame member adapted to alternately move said frame member in a repeated sequence first in the direction of motion of said conveyor section at a rate of speed relative to said framework slightly less than the rate of speed of said conveyor section relative to said framework and then in the opposite direction at an abrupt speed;

and supply means operatively connected to said nozzle means adapted to force semi-frozen confection material through said nozzle outlet at a rate of speed relative to said framework substantially equal to the speed of said conveyor section relative to said framework during movement of said conveyor in the direction of motion of said conveyor section.

7. The combination as defined in claim 6 wherein said operating means comprises:

a revolving cam mounted on said framework for rotation about an axis located in a plane perpendicular to the direction of motion of said conveyor section relative to said framework, said cam having a peripheral configuration increasing gradually in radius in its intended direction of rotation on said framework and abruptly returning to its initial radius;

and cam follower means engaged by the peripheral configuration of said cam operatively connected to said frame member adapted to impart reciprocable movement to said frame member responsive to rotation of said cam.

8. The combination as defined in claim 6 further comprising:

material cut off means mounted on said framework adapted to cut across the material extruding from said nozzle outlet, said material cut off means being operatively connected to said operating means and adapted to be actuated immediately prior to movement of said frame member in said opposite direction.

9. In combination with a rigid supporting framework, a continuous conveyor mounted on said framework having a supporting surface adapted to carry confection material for further processing, and including a straight section moving at a constant speed relative to said framework;

an extrusion apparatus adapted to direct a strip of semi-frozen confection material onto the supporting surface of said conveyor in longitudinally interrupted lengths, comprising:

a frame member movably mounted on said framework;

nozzle means mounted on said frame member including a nozzle outlet facing in the direction of motion of said conveyor section and located adjacent the supporting surface of said conveyor section;

operating means on said framework operatively connected to said frame member and to said conveyor adapted to move said frame member relative to said framework in a timed relation with movement of said conveyor, the movement imparted to said frame member by said operating means having a component parallel to the direction of motion of said conveyor section;

and supply means operatively connected to said nozzle means adapted to direct semi-frozen confection material through the nozzle outlet.

10. An apparatus as defined in claim 9 further comprising:

material cut-off means mounted on said frame member operatively connected to said conveyor adapted to cut across the material extruding from said nozzle outlet in a timed relation relative to the movement of said conveyor on said framework.

References Cited by the Examiner
UNITED STATES PATENTS

| | | | |
|---|---|---|---|
| 1,832,374 | 11/1931 | Forby et al | 107—14 X |
| 2,122,703 | 7/1938 | Weinreich | 107—14 |
| 2,188,418 | 1/1940 | Routh. | |
| 2,359,403 | 10/1944 | Burt | 83—353 X |
| 2,740,362 | 4/1956 | Elliott | 107—14.1 X |

WALTER A. SCHEEL, *Primary Examiner.*

BILLY J. WILHITE, *Examiner.*